Oct. 18, 1960 — E. T. NORD — 2,956,826
COUPLING UNIT

Filed March 2, 1955 — 2 Sheets-Sheet 1

INVENTOR.
ERIC T. NORD
BY
ATTORNEYS

Oct. 18, 1960  E. T. NORD  2,956,826
COUPLING UNIT
Filed March 2, 1955  2 Sheets-Sheet 2

INVENTOR.
ERIC T. NORD
BY
ATTORNEYS

United States Patent Office 2,956,826
Patented Oct. 18, 1960

2,956,826
COUPLING UNIT

Eric T. Nord, Oberlin, Ohio, assignor to U.S. Automatic Corporation, Amherst, Ohio, a corporation of Ohio Filed Mar. 2, 1955, Ser. No. 491,662

12 Claims. (Cl. 287—52)

This invention relates to torque or force and motion transmitting couplings and/or detachable gripping devices for coupling and securing elements in aligned driving relation between which torque or force and motion is sought to be transmitted.

More particularly, my invention comprises an improvement in the prior practice of coupling such elements as, for example, the shaft and the hub of a wheel or gear by the mutual radial expansion and contraction of one or more pairs of mated wedge-shaped annular resilient rings by the forcible relative axial motion of which the inner ring or rings are tightly constricted upon the shaft and the outer ring or rings are forcibly expanded into tight engagement with the hub, assuming the hub and shaft have spaced concentric coaxial cylindrical surfaces engageable by the pair or pairs of rings. My invention has a broad range of uses and may also take the form, for example, of a clamping device for an internal or external chuck as for a machine tool wherein the expansion and contraction of the rings is utilized to releasably engage a work piece and hold the same in drivable concentric relation to the spindle of the machine. Such was the illustration of the prior U.S. Patent to Peter No. 2,573,928 upon which, among others, my invention is an improvement.

My invention provides, among other things, a further improvement over the prior practice of coupling shafts and hubs or sleeves as with keys or splines, in that it involves no weakening of the shaft or hub, transmits much greater force or torque, insures perfect concentricity and alignment, has the perfection of a shrink fit with, however, entire ease and facility of repeated quick attachment and detachment.

The prior practice of expanding and contracting wedge rings involved hazards and problems avoided and solved by my improvements. With the prior rings, see Figure 5 of the within drawings, radial stress tended to be unevenly distributed and/or highly concentrated, frequently tending to put undesirable or bursting strain on the hub, or indenting the hub or shaft surface adjacent an overstressed end of the ring or pair of rings and impairing a recoupling of the hub and shaft. Prior rings tended to cock or misalign relative to each other during insertion between the surfaces to be coupled, both rendering assembly awkward and often failing in their intended coaction and/or destroying the ultimate desired alignment of the hub and shaft when coupled. Prior rings also tended to gouge the coacting wedge or conical surfaces, impairing their intended coaction and tended to be upset adjacent their ends under axial working force whereby to distort their cylindrical surfaces, inhibit their relative motions and injure the adjacent surfaces of the elements to be coupled. Prior practice has also been burdened with the hazard of foreign matter intruding between the wedge surfaces, not only tending to cock and misalign the rings, but also injuring the surfaces and impairing the intended action of the rings. Prior practice depended upon the practically impossible provision of geometrically truly conical wedge surfaces and the true mating of such surfaces and for a second or repeated coupling often required that the rings be reassembled in the same angular relation first obtained when originally coupled, a thing also quite impracticable in workaday use.

An object of my invention is to solve the problems and avoid the hazards mentioned above. Another object of my invention is to avoid deleterious stress concentrations between the rings and the coupled elements; to gain a uniform distribution of such stress; to increase the effective contact area between pairs of rings and coupled elements in relation to difference between the diameters of the cylindrical surfaces of the elements, and to increase the torque transmitting capacity of the coupling in relation to the strength of the coupled hub or sleeve where the latter limits the torque capacity of the coupled elements.

Another object is to insure full coaction between the wedge surfaces of pairs of rings; to avoid canting, cocking gouging or abrasion of or between such surfaces; to insure proper alignment of the rings at all times in, prior to and between couplings of the elements to be coupled; to insure proper alignment of the coupled elements; to facilitate assembly of the rings and elements to be coupled; to exclude dirt or foreign matter from between the working wedging surfaces; to protect the surfaces of the coupled elements and preserve their true cylindrical form and aspect, and to reduce the axial motion necessary to perfect the coupling.

Other objects include the provision of pre-stressed, pre-assembled pairs of wedge rings truly aligned with parallel ends and coaxial inner and outer cylindrical surfaces and fully coacting wedge surfaces and accurately dimensioned in their prestressed, pre-assembled state and capable of repeated use and rough handling without loss of their intended virtue, efficiency or quality.

These and other objects and advantages of my invention will more fully and at large appear from the following description of a preferred and illustrative form and embodiment of my invention, reference being had to the accompanying drawings, in which.

Figures 1, 2, 3:
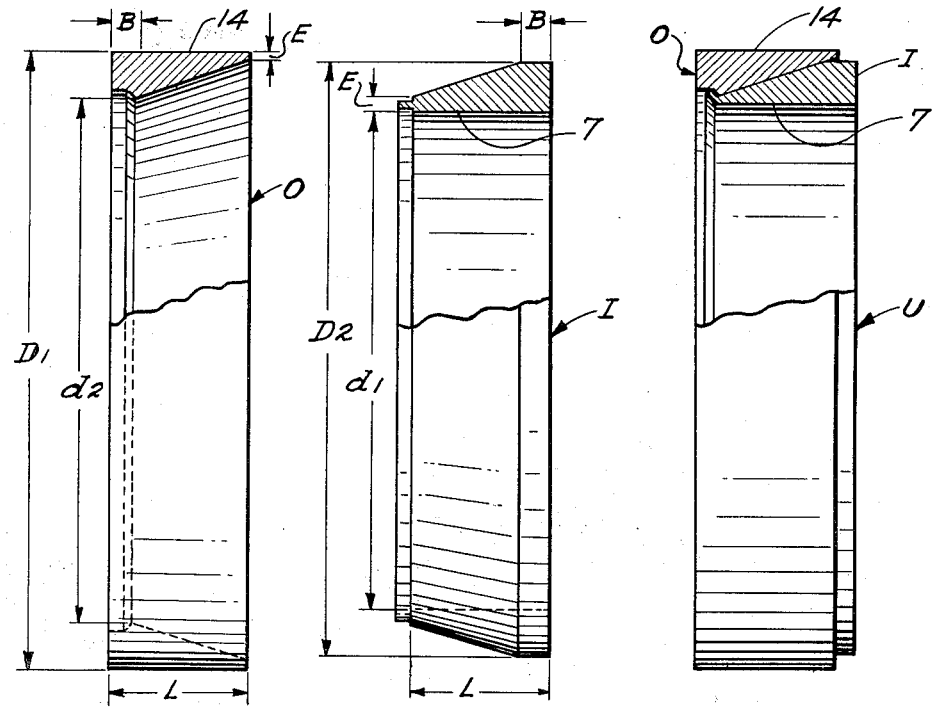
Figure 1 is a side elevation, partly in longitudinal section, of a female ring of a pair of rings.
Figure 2 is a side elevation, partly in longitudinal section, of a male ring of a pair of rings.
Figure 3 is a side elevation partly in section of an assembled pair of the rings shown in Figures 1 and 2.
Figure 4:
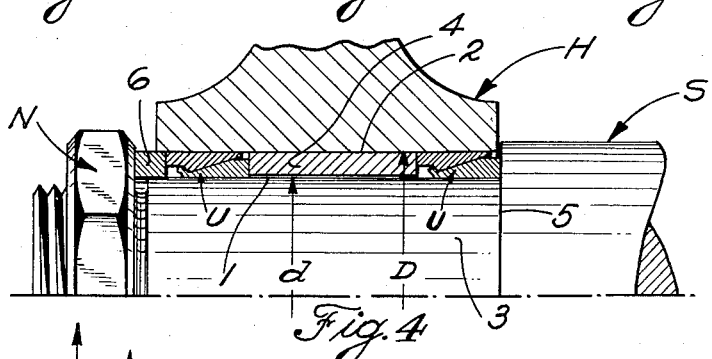
Figure 4 is a half-longitudinal section on a reduced scale of an illustrative assembly of a shaft and hub coupled with two pairs of rings, according to my invention.
Figure 7:
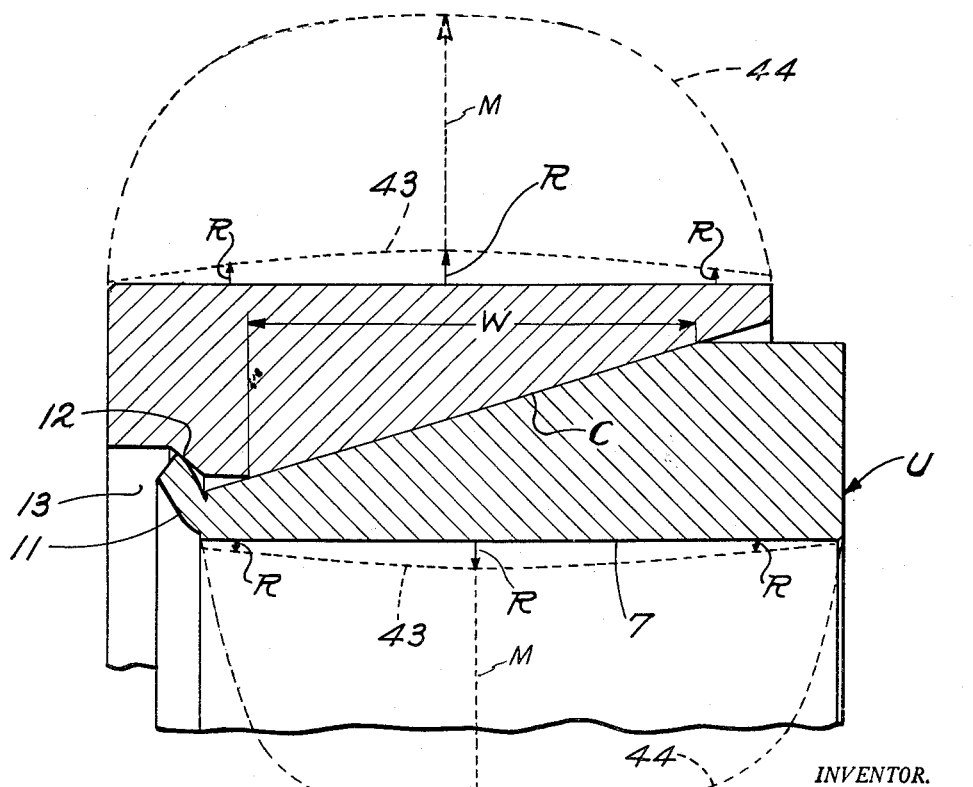
Figure 7 is an enlarged view similar to Figure 6 showing the rings in stressed assembled relation corresponding to Figure 3 and suggesting in broken dashed and dotted lines respectively stress patterns in the pre-stressed state and as contemplated under full load-working conditions.

The working unit U of a preferred form of my invention comprises a pair of stressed, tightly assembled, coaxial, concentric, resilient, preferably metallic, completely annular rings O and I, Figures 1–3 and 7 in which the opposite ends of the rings, i.e. the opposite ends of the unit, are normal to the axis and the rings, are constrained in mutually stressed engagement substantially throughout the common substantially conical mating surface C as by the outwardly crimped annular flange or tang 11 of the ring I, Figures 3 and 7, forcibly bearing on the juxtaposed surface 12 in the recess 13 of the ring O. A pair of units U disposed between the cylindrical exterior surface 1 of the extension 3 of the shaft S, Figure 4, and the cylindrical interior surface 2 of the hub H, which may be the hub of any wheel, gear, work piece or like instrumentality, and preferably spaced apart by the sleeve 4, secures and couples the hub and shaft together when compressed axially between the shoulder 5 of the shaft and the nut N threaded on the end of the shaft and acting through the sleeve-like washer 6, to give the rings of the unit relative axial motion and expand and contract the units and exert inward and outward mutually generated and opposed radial gripping forces on the surfaces 1 and 2 adjacent the units.

For the best practice of my invention, the minimum interior diameter of the inner surface 7 of the pre-stressed unit U, i.e. of the stressed inner or male ring I, before being worked to couple the hub and shaft, exceeds the outside diameter of the surface 1 of the shaft only enough to afford a free, close sliding fit, allowance being made for manufacturing tolerance, particularly of the surface 1 of the shaft. Similarly, the maximum exterior diameter of the outside surface 14 of the pre-stressed unit U, i.e. of the outer or female ring O, before being worked to couple the hub and shaft is less than the inside diameter of the surface 2 of the hub by only enough to afford a free close sliding fit therewith with allowance for manufacturing tolerances. Where units U are employed, as in Figure 4, the sleeve 4 and washer 6 will have free sliding fits with the surfaces 1 and 2 to facilitate the transmission of axial force from the nut to the units. The employment of the spacer 4 between the units is merely illustrative of one practical way of disposing the units U in relation to the elements to be coupled. By disposing each of a pair of units near the end of the cylindrical surfaces 1 and 2, better axial alignment of those surfaces, and therefore of the hub and shaft, tends to be insured. While it is practical to employ two or three extra units in place of the spacer 4 in such an installation as suggested in Figure 4, it is often uneconomical as well as unnecessary to do so because the pair of rings comprising a unit immediately adjacent the thing such as the washer 6 which moves the first ring axially does approximately one-half the whole gripping work of all the units in any series of units that depend on the same thing, and the intervening units, for axial operating force and motion. That is to say, in an infinite series of units bearing axially upon one another with axial force and motion imparted only to one end of the series of units, the first unit will do approximately one-half the work, the second one-fourth, the third one-eighth and so on, with the result that, for most practical purposes, a pair of units will do approximately 75% to 80% of all the gripping work that could be obtained from an infinite series of units where the axial force and motion is applied directly to only the first unit of the series. Therefore, I find it practical and illustrative to suggest as above, the employment of only a pair of units and the spacing thereof as by the spacer 4 to position the units near the opposite ends of the cylindrical surfaces of the elements to be coupled to insure the desired coaxial alignment of the elements and to get the "most for the money" per unit employed. Should it be desired, for example, to develop twice the gripping effect in an installation similar to that shown in Figure 4, four units U might be employed instead of the two shown with the elimination of the spacer 4, and the two such units to the right, as would be viewed in Figure 4, could then be separately activated as by a second nut threaded on the shaft in about the place of the shoulder 5 whereby to activate the right units independently of the left units. Then the two right units could be expanded and contracted as fully as to two left units and the doubled total grip obtained.

Figure 6:
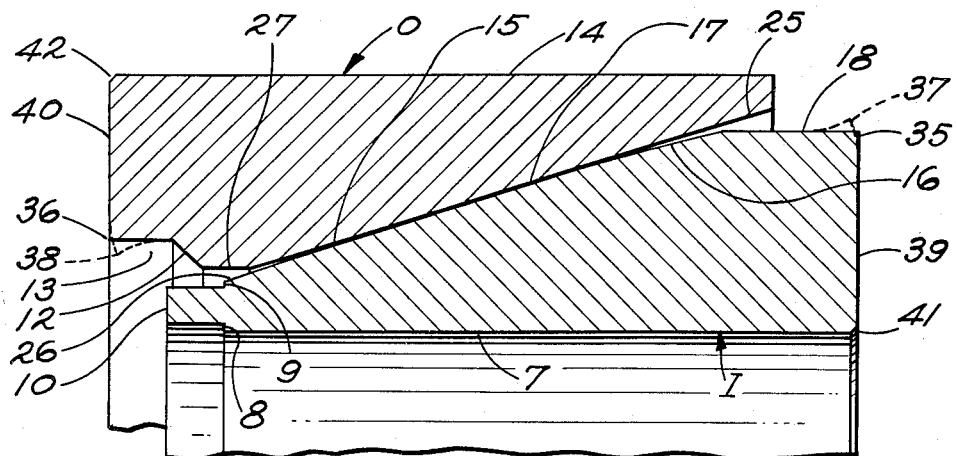
Figure 6 is an enlarged fragmentary longitudinal section of the rings of Figures 1–3 in preliminary "pre-assembled" relation, aligned and in initial contact with each other.

Referring now to the character of the mating surfaces 15 and 16, Figure 6 of the rings O and I, I have observed in the prior practice the practical difficulty, if not impossibility, of making the tapered mating surfaces of any pair of coacting wedge rings truly geometrically conical and of precisely equal cones, and therefore I provide that only one of the tapered mating surfaces of a pair of my mating rings, such as the surface 15 of the ring O be made as truly conical as practciable, whereas the other mating surface, such as the surface 16 of the ring I, the arbitrarily made, not truly conical, but rather rounded convexly slightly from true conicalness from end to end on a large radius whereby to tend to have an intial contact with the other mating surface approximately mid-way between the ends of the juxtaposed surfaces at the point or zone 17. The slight bulging or convex curving of the otherwise conical surfaces 16 is conveniently done by merely offsetting the cutting tool from true normalcy to the surface being generated. As a practical matter, my preference is that the bulging or convexity of such a surface as the surface 16 be raised only about one thousandth of an inch per longitudinal inch of surface above the middle of a true conical surface. Incidentally, I prefer to turn each of the surfaces of a pair of mating surfaces so that the tool marks will come out of opposite hand so that the helices of the tool marks on the surfaces may cross rather than coincide.

Figure 5:
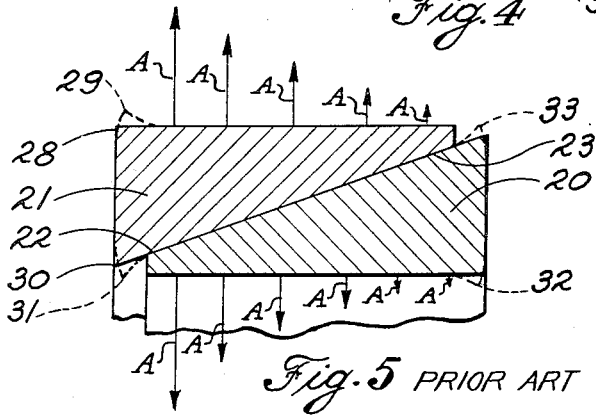
Figure 5 is a fragmentary longitudinal section of a pair of rings illustrative of practice prior to my invention.

By bulging one of the two otherwise conical mating surfaces the tendency of the mating surfaces to first contact at one end or the other when the axes are coincident is substantially eliminated. In Figure 5 it is suggested of the prior practice that if the pitch of the conical surface of the male ring 20 were but slightly less steep than the pitch of the female ring 21, then the male surface would first tend to contact at the point 22 at the small end of the male ring and do two things adversely: (1) tend to gouge into the conical surface of the female ring when the rings were forcibly moved axially into more forceful engagement with each other, and (2) produce an asymmetrical and uneven stress pattern of expansion and contraction of the female and male rings as suggested by the arrows A; the greater stress being developed at the left, as viewed, end of the pair of rings where the conical surfaces first engaged and being less at the other end where the conical surfaces last engaged. Were the relative pitches of the cones reversed so the conical surfaces first tended to engage at the point 23 at the opposite end of the pair of rings, the opposite result would follow with equally undesirable consequences. That is to say, only equally pitched truly conical surfaces can mate properly and get an equal distribution of stress when the rings are worked for their mutual expansion and contraction. Since, however, ordinary manufacturing techniques can rarely produce identical conical surfaces, and since coaxial non-identical frusto-conical surfaces must contact first at one end or the other I make one of the mating surfaces arbitrarily not purely conical, as described above, with the advantage that the surfaces tend to meet approximately midway between their ends and produce with satisfactory uniformity an even and symmetrical stress pattern throughout the whole length of a mated pair of rings. By the same token the slight bulging of one of the conical surfaces obviates the tendency of one of the rings to gouge the other because initial contact will first be had smoothly approximately midway between the ends of the mating surfaces.

As also shown in Figure 6, each of the rings O and I is considerably longer than the part of the ring having the wedging surface. Thus the ring I has an external cylindrical surface 18 extended rightwardly, as viewed from the base or rightward end of the inclined surface 16 whereby the large end of the ring I extends rightwardly beyond the inclined surface, and thus the right end of the ring has a cantilever relation to the surface 16 and to the stock directly encompassed thereby. Similarly, the large, leftward as viewed, end of the female or outer ring O extends beyond the leftward end of the wedging surface 15 overlying the inner cylindrical surface 27 and the recess 13, and in cantilever relation to the surface 15 and the stock of the ring lying directly outwardly of the surface 15. I also prefer, as shown in Figure 6, that the small ends of both rings also have a cantilever relation to the bodies of the respective rings and overhang and be spaced from the opposite ring beyond the mutually engageable parts of the tapered surfaces, also preventing, inter alia, gouging of one ring into the tapered surface of the other. Thus the rightward end 25 of the tapered surface 15 of the ring O extends beyond the rightward end of the tapered surface 16 of the ring I in the direction that the ring O will be moved relative to the ring I to work the rings for the mutual expansion and contraction, and the extreme leftward end 26 of the surface 16 preferably overlies the cylindrical surface 27 at the leftward end of the tapered surface 16 in the direction of relative axial movement that the ring I has with respect to the ring O during the mutual working of the rings.

These cantilever extensions of the rings beyond the common mutually engaged mating surface improve the distribution of working stress between the rings and the cylindrical surfaces of the elements to be coupled, and obviate the adverse stress concentrations suggested in Figure 5, and, particularly in combination with the bulging of one of the mating surfaces, tend to give a broad uniform distribution of gripping stress throughout the length of the rings and units with the coupled elements. It will also be noted that should the initial point or zone of contact 17 between the conical mating surface 15 and the slightly bulged mating surface 16 depart more or less from the approximate middle of the unit that the adverse stress concentrations, suggested in Figure 5, will still be prevented because the cantilever extensions of each of the rings will always lie beyond any point or zone of initial contact or maximum stress between the common mating surface of the rings, see Figure 7.

As suggested in Figures 6 and 7, my preference is that the cantilever extensions of the rings of the unit be such that the overall length of the unit be about half again as great as the length of the common mating surface of the rings of a unit as measured prior to the ultimate working thereof.

According to prior practices, as also suggested in Figure 5, the prior way of increasing the length of a pair of wedge rings and the cylindrical bearing area of one of them on the hub, for example, to be coupled, whereby to reduce the unit stress between the ring and the hub for the transmission of a given desired torque, required the corresponding increases in the radial thickness of the rings of the pair, which in turn required either an enlargement of the bore of the hub or a reduction in the diameter of the shaft. But often increasing the bore of the hub for a given design of hub and shaft tended to weaken the hub deleteriously and similarly a reduction in the diameter of the shaft tended to weaken the shaft deleteriously. Therefore, the prior practices often presented the unhappy dilemma of risking a fracture of the hub incident to enlarging the bore to accommodate a bigger ring, or alternatively, risking the permanent indentation of the surface of the bore thereof or of the shaft by the use of a short ring with high unit pressure. According to my invention, however, by extending the lengths of the rings with cantilever effect relative to the common wedge surface as described above, I gain not only good distribution of stress, but also the wider bearing areas between the gripping units and the elements to be gripped. The resulting lower unit pressures permit the transmission of higher torque without unduly stressing the hub or shaft or the surfaces thereof and without requiring a wide difference between the diameters of the cylindrical surfaces of the hub and shaft as prior practices required.

Referring again to Figure 5, another of the problems which has bedeviled the prior wedge ring practice has been the upsetting of the end corners of the rings when the same were subjected to the axial forces necessary to effect their desired mutual expansion and contraction.

Thus if the nut, washer, spacer or shoulder exerting the axial pressure on the ring 21 bore upon its outer corner 28 rather than truly throughout its whole end surface by virtue of lack of true normalcy of the end surface of the ring to the axis thereof or by virtue of any similar departure from true normalcy of the surface of the instrumentality bearing upon the ring, the adjacent external cylindrical surface of the ring tended to be upset as suggested with exaggeration in dotted lines at 29, tending to indent or scuff the adjacent part of the cylindrical surface of the hub for example, into which the ring 21 was being forced axially and expanded. This not only tended to impair the surface of the hub as against a proper recoupling but also tended to impair the desired relative working of the rings and tended to leave the ring with an upset portion near its end having the tendency to impair the desired relation between the ring and any other surface or portion of a surface with which the ring was sought to be recoupled. On the other hand, if the ring 21 were forcibly contacted substantially exclusively at its inner end corner 30 by the working instrumentality it would tend to upset the tapered surface of the ring as suggested with exaggeration in dotted lines at 31. The upset tapered surface would invite gouging by the end of the ring 20 and impair the desired relative axial motion between the rings during the working thereof. Equal and undesirable results tended to occur at the opposite end of the ring 20 according to the prior practices as suggested by the dotted lines at 32 and 33. These things transpired in the prior practices because of the commercial impracticability of making the end surfaces of the rings truly geometrically normal to the axis thereof and/or making the surfaces of the nuts, washers, shoulders or spacers which coacted with the rings truly geometrically normal to the axis of the elements intended to be coupled by the rings. My solution of this problem, see Figure 6, takes a plurality of mutually complementary aspects. Firstly, the so-called cantilever extensions of my rings locate the "inner" end corners 35 and 36 of the rings respectively remote from the coacting tapered surfaces of the rings and remote from either of the cylindrical surfaces of the rings and of the elements to be coupled. As a result, any upsetting of the adjacent cylindrical surfaces, as suggested with exaggeration by the dotted lines at 37 and 38 respectively, will be entirely harmless in respect to the operation of the rings and the units which they comprise. Secondly, in the manufacture of the ring I, I cause the end surface 39 to have preferably a slight taper or conical form so that the portions of the end surfaces 39 which lie radially inward of the outer corner 35, or at least portions which lie radially near the inner corner circle 41, will lie leftwardly, as viewed, from the plane of the circle of the corner 35 whereby contact between the end 39 of the ring I with any shoulder, nut, sleeve, spacer, ring or unit will be engaged at or near the corner 35 before making contact throughout the remainder of the end surface 39 so long as the external instrumentality is within ordinary manufacturing tolerances of normalcy from the axis of the ring. Biasing the cut-off tool which severs the ring from the stock from which it is made to favor the slight desired conicalness of the surface 39 is one practicable way of forming the surface 39 to avoid upsetting of the inner cylindrical surface 7 near the inner corner circle 41. I prefer that this conicalness be not necessarily or advisedly greater than an amount which will tend to bring initial contact at or near the corner 35, or at least removed from the inner corner circle 41, with all instrumentalities against which the ring is intended to bear which have surfaces truly normal to the axis of the ring or only depart from the normalcy within acceptable commercial tolerances. Similarly, the end surface 40 of the ring O is preferably given the same order of conicalness so that the corner 36, or at least a portion of the surface 40 radially removed from the outer corner circle 42, will lie rightwardly, as viewed, from the plane of the circle of the corner 36 and will thus first contact a surface truly normal to the axis of the ring and the more radially outwardly disposed portions of the surface 40 will not be first engaged by other instrumentalities with which they are intended to contact so long as those instrumentalities do not have contacting surfaces deviating from normalcy more than by reasonable commercial tolerances. Therefore, the rings comprising my working units invite the tendency to upset the ends of the units at the places provided where such upsetting shall not impair the operation of the unit or jeopardize the surfaces of the elements where the surfaces are engaged by the units. I also prefer that the extreme inner corner 41 of the ring I and the extreme outer corner 42 be chamfered slightly or at least deburred to prevent the rings from scratching the surfaces of the elements, and, collaterally to aid in preventing the adjacent cylindrical gripping surfaces of either ring from being upset should any external instrumentality tend to bear too strongly near these corners of the rings rather than at or near the corners 35 and 36 as above intended and provided.

As suggested in the introduction to this specification, my preference is that the rings O and I be mutually and preliminarily stressed and assembled as shown in Figures 3 and 7 to comprise the stressed and assembled coupling unit U for handling, storage and ultimate use or repeated use. As shown in Figure 6, the rings are in mated operable relation to each other and in initial contact at or about the point or area 17, and it will be understood and appreciated that such a pair of rings so related may be put to ultimate use, as in Figure 4, with many of the advantages of my invention without first having been pre-stressed and/or assembled together and correspondingly without the added advantages and facility thereof presently to be described.

As suggested above the small or forward, leftward, as viewed in Figure 6, end of the ring I has a "forwardly" extending annular tang 10, preferably thinner than the next adjacent thickness of the ring and demarked therefrom by small stepped inner and outer shoulders 8 and 9 by virtue of which the intended flaring and crimping the tang, as shown in Figure 7, will not tend to influence the form of the surfaces 16 and 24 of the ring adversely. The large or rearward, left as viewed, end of the ring O has an annular recess 13 with an abruptly inclined and radially outwardly flaring inner wall 12 against which the tang 10 may be bent to forcibly bear and hold the rings assembled together and/or pre-stressed and assembled together, Figure 7.

To effect stressed assembly of the rings O and I they are preliminarily related to each other approximately as shown in Figure 6, coaxially and concentrically with the circles of the end corners 35 and 36 normal to the coincident axes of the rings. Then the ring I is forcibly advanced into the ring O, Figure 7, while the coaxial alignment is maintained, with axially opposed forces exerted on the opposite big rearward ends of both rings sufficient to bring the rings into a tight fit with each other along their mating inclined surfaces and preferably with sufficient force to bring the whole slightly bulged conical surface 16 of the ring I into full contact throughout substantially its full lentgh with the juxtaposed surface 15 of the ring O to establish the full common surface of contact C, Figure 7. Simultaneously both rings are stressed and mutually and respectively expanded and contracted preferably to the extent that the diameters of their exterior and interior cylindrical surfaces 14 and 7 are changed up to about 10% to 30% of the maximum expansion and contraction thereof intended to be given these diameters when the rings are used to couple two elements together for full working load and service. While the rings are thus forced and held in mutually stressed engagement, the tang 10 is forcibly flared and bent outwardly and given a permanent set in tight forcible contact with the surface 12, Figure 7, so that the bent tang, identified by reference numeral 11 in Figure 7, thereafter prevents the rings from moving apart, holds them in the stressed assembled relation shown in Figure 7, and freely permits the further or deeper relative engagement of the rings and the further "swelling" of the unit for the coupling action and utility thereof as described with reference to Figure 4.

The rings may, of course, be assembled with little or no mutual stress by flaring out the tang 10 when they are in but nominal initial contact shown in Figure 6 and the advantages of keeping the surfaces 15 and 16 clean and free from external abrasion and keeping the rings mutually aligned and easily handled as a unit, will obtain in substantial measure.

The most desirable amount of pre-stress to be used to form the stressed unit U may be gauged from a number of considerations. Since pre-stress adds thickness to the unit it correspondingly subtracts from the clearance between the units and the surfaces 1 and 2 of the coupled elements, Figure 4, when the preliminary assembly of hub, shaft and units is made. Since, or when, self-release of the units is desirable for detachment of the coupled elements and re-use of the units (the pitch of the mating surfaces preferably being above the critical angle), the maximum desired working radial "swelling" of the unit is preferably sought to be kept fairly within the elastic limit of each of the rings and therefore no undesirable high fraction of the stress at the elastic limit is sought to be consumed in pre-stress. Since, however, the greater part of stretching the outer ring and compressing the inner ring, when a coupling operation is effected, is given to taking up the clearance between the units and the cylindrical surfaces of the elements to be coupled, the units may be stressed near their elastic limits at the point of full load bearing engagement with the elements to be coupled without exceeding their elastic limits when additionally stressed to full working coupling load.

Favoring pre-stress and/or relatively high pre-stress in the units, within the limits suggested above, is the advantage that the stressed and assembled units are more positively held in concentric coaxial alignment at all times prior to use and/or between uses. Also, the originally non-coincident mating surfaces are held fully in contact at all times prior to use, and between uses, and therefore positively self-exclusive of foreign matter coming therebetween. Additionally pre-stressing permits the units to be given "final" preliminary shape and size with accuracy supplemental to and/or corrective of errors in machining or otherwise forming or finishing the rings. And, pre-stressing reduces the axial travel required between rings of the unit in coupling external elements, such as the hub and shaft, together; the latter having especial significance where, for example, a fine angular adjustment or relationship is sought between the coupled elements. It will be noticed that units of my invention are capable of affording an infinite choice of accurate angular relations and adjustments between the coupled elements.

In Figure 7 the pattern of pre-stress suggested by the dashed lines 43 and the small solid arrows R may be taken as diagrammatically illustrative of the distribution of a desirable state of pre-stress in the assembled unit; the greater stress in each ring being near the mid-length of each ring and near the mid-length of the common mating surface C; a condition advantageously following the provision of the bulge given the surface 16 of the ring I. It therefore also follows that the external cylindrical surfaces 7 and 14 of the pre-stressed unit U will each be slightly bulged in approximately the same way that the stress patterns are shown by the lines 43 but to an extent probably somewhat less than but commensurate with the bulge given the surface 16. Even though these bulges in the surfaces 7 and 14 be slight, the pre-stressed unit U as viewed in the section of Figure 7 has, pro tanto, a slight barrel shape nicely conducive to free sliding motion relative to the surfaces 1 and 2, Figure 4, of elements to be coupled with very slight clearance and with marked freedom from chattering, canting and binding while preliminarily assembling the units with the elements prior to the actual coupling thereof. Moreover the stressed barrel shape of the units predisposes, and/or reflects the predisposition of, the units to first contact and engage the opposed coaxial cylindrical surfaces of the elements to be coupled near the mid-lengths of the units so that when the units are stressed to full gripping load with the elements, the radial stress developed between surfaces 7 and 14 of the unit and the respectively engaged portions of the cylindrical surfaces of the coupled elements will tend to follow the stress patterns suggested by the dotted lines 44 and the dotted arrows M, Figure 7. The stress patterns 44 also reflect the mutual dual cantilever disposition of the ends of the rings to the mutual wedge bearing surface C wherewith, and with the bulge emanating from the surface 16, the patterns are rounded at their ends, devoid of deleterious concentration, and show the wide, smooth, desirable distribution of stress obtainable between the units and the coupled elements.

To further facilitate the practice and enjoyment of my invention proportional dimensions useful in making my rings and units in a wide variety of sizes are given below with reference particularly to Figures 1–4, and 7, wherein D represents the internal diameter of the surface 2 of the hub; $d$ the external diameter of the surface 1 of the shaft; $D_1$ the external diameter of the female ring O; $d_2$ the external diameter and $d_1$ the internal diameter of the male ring I; L the length of the rings exclusive of the tang 10—11, i.e. the length of the cylindrical gripping surfaces; E the minimum thickness of the rings at the small ends, exclusive of the tang; B the length of the "overhang" at the big end of the ring; and W, see Figure 7, the length of the tapered surface of common contact between both rings measured parallel to the axis when, however, the rings have been worked into full contact with the surfaces 1 and 2 of the shaft and hub, not literally shown in Figure 7. The relation between the several dimensions expressed in inches is approximately:

$D_1 = D - .002''$/per inch of diameter
$d_1 = d + .002''$/per inch of diameter
$D_1 = 1.193 d_1 + .092''$
$d_2 = d_1 + 2N$
$D_2 = D_1 - 2N$
$L = .254 d_1 + .040''$
$E = .012 d_1 + .012''$
$B = .033 d_1 + .033''$
$N = E + B/10$ Then W will average about $.2d$, and for the clearances suggested between $D_1$ and D and between $d_1$ and $d$, the units may be worked to exert about 60,000 lbs. per square inch on the hub and shaft without exceeding the elastic limits of the rings made of free-machining steel. When the units are prestressed as above taught, the clearances at the time of assembly of the units with shaft and hub will be slightly less than that noted above at the points of greatest bulge of the interior and exterior cylindrical surfaces of the units.

While I have mentioned my preference for working the units within the elastic limits of the rings, the utility of my invention is not so limited. For example, a unit made of free-machining steel, as I prefer, if worked to couple a hub and shaft with clearances such that the elastic limit of the rings is not immoderately exceeded will still have appreciable "spring-back" and free itself of the coupled parts when axial coupling pressure is released, and remain useful for recoupling the same or similar elements, although such a unit may, when released from axial gripping force, have lost some or all of its prestress, as such, had it been prestressed before being so worked.

While I have illustrated and described preferred forms and practices of my invention, changes and modification in and improvements upon the same will occur to those skilled in the art without departing from the spirit and principles of my invention, nor from the intention of my teachings, illustrations and examples herein set forth. Therefore, I do not desire to be limited in the scope and effect of my patent to the forms and examples of my invention herein specifically illustrated and disclosed, nor in any manner inconsistent with the progress by which the art has been promoted by my invention.

I claim:

1. A coupling unit comprising a mated and nested pair of annular resilient inner and outer rings coaxially disposed and having respectively outer and inner coaxial tapered surfaces mutually engageable and having respectively big and little ends oppositely disposed whereby forcible relative axial motion of the inner ring into the outer ring tends to contract the former and expand the latter into gripping engagement with internally and externally disposed elements to be coupled, the said tapered surfaces being substantially equally frusto-conical with, however, one of said surfaces having an annular bulged convexity departing from true conicalness, said convexity having its greatest height substantially midway between the ends of said surface and predisposing said surfaces to have initial contact approximately midway between their ends when said surfaces are coaxially aligned and engaged.

2. The coupling unit of claim 1 in which said bulged convexity is of large radius and small height and is insufficient to prevent full mating engagement between substantially the whole mutually juxtaposed areas of said surfaces when said unit has expanded to gripping engagement with said elements.

3. The coupling unit of claim 1 in which the outer ring has an outer cylindrical surface coaxial of its tapered surface and the inner ring has an inner cylindrical surface coaxial of its tapered surface, said cylindrical surfaces being appreciably longer than said tapered surfaces, and each cylindrical surface extending longitudinally beyond the mutually contacting areas of the tapered surfaces in both directions.

4. The coupling unit of claim 1 in which the tapered surface of each ring extends from near the thin end of the ring of which it is a part to a line remote from the thick end of the same ring, and the tapered surface adjacent the thin end of each ring is spaced from and overlies a portion of the other ring adjacent the thick end of the other ring, both ends of each ring having an overhanging cantilever relation to the end portions of the other ring adjacent the mutually engageable portions of said tapered surfaces whereby to preclude radial stress transmitting engagement between the end portions of said rings.

5. The coupling unit of claim 1 with self-contained means formed integrally with one of said rings and engaging the other of said rings for holding said rings tightly and coaxially assembled with said tapered surfaces in mutual engagement while permitting relative axial motion between said rings in the direction of mutually stressing each other.

6. The coupling unit of claim 1 in which the inner ring has an inner cylindrical surface adapted to engage said internally disposed element and disposed coaxially with said tapered surface of said inner ring and has an outer annular surface at the big end thereof of smaller diameter than the tapered surface of the outer ring adjacent thereto and radially spaced therefrom, and the outer ring has an outer cylindrical surface adapted to engage said externally disposed element and disposed coaxially with said tapered surface and has an inner annular surface at the big end thereof of greater diameter than the tapered surface of the inner ring adjacent thereto and radially spaced therefrom, the end surfaces of the said big ends of said inner and outer said rings respectively having portions which first contact planes normal to the common axis thereof in areas radially spaced from said inner and outer cylindrical surfaces respectively.

7. A prestressed self-contained and self-sustaining coupling unit having an axis and comprising a pair of concentric, annular resilient stressed male and female rings having mutually stressed engagement on substantially conical coacting surfaces pitched above the critical angle, the rings also having respectively inner and outer right circular cylindrical surfaces coaxial of said unit, each ring having a small thin end portion and a big thick end portion oppositely disposed relative to each other, each big end portion having an end surface approximately normal to said axis; the forcible entry of the male ring into the female ring increasing the wall thickness of the unit as measured between and cylindrical surfaces for coupling engagement with external instrumentalities having spaced coaxial male and female surfaces juxtaposed to the said inner and outer surfaces of said unit, said unit also comprising a tang part integral with the small thin end portion of one ring and comprising that the big thick end portion of the other ring have a recess adjacent and engageable by the said tang part of said one ring, said tang part engaging said recess after having been worked after the rings are assembled and given a permanent set into said engagement after said rings have been put in mutually stressed engagement, said tang part after being worked into engagement with said recess in said big end preventing relative motion of said rings in the direction of disengagement and freely admitting motion of said rings in the direction of increased wall thickness of the unit.

8. The coupling unit of claim 7 in which said tang part lies radially between the cylinders of said cylindrical surfaces and axially between the said end surfaces of the big ends of said rings.

9. A coupling unit adapted to grip and transmit force and motion between inner and outer elements, such as a shaft and a hub which have radially spaced, longitudinally aligned coaxial cylindrical surfaces between which said unit is disposed and worked to increased radial thickness, said unit comprising a nested pair of annular inner and outer resilient rings coaxially and concentrically disposed, the inner ring having an inner circular cylindrical surface, a thick end and a thin end with an outer tapered surface therebetween; the outer ring having an outer circular cylindrical surface, a thick end adjacent the thin end of the inner ring and a thin end adjacent the thick end of the inner ring with an inner tapered surface between the thick and thin ends thereof coacting with the tapered surface of the inner ring, the thick end of said inner ring being of less external diameter than the internal diameter of the thin end of said outer ring, the thick end of said outer ring being of greater internal diameter than the external diameter of the thin end of said inner ring, and each of said thick ends of said rings having a portion adjacent and radially spaced from and partially overlapped by a portion of the tapered surface of the other ring and each thick end extending longitudinally beyond the thin end of the other ring when said tapered surfaces are in mutual engagement, the overall length of said unit when said tapered surfaces are in mutual engagement not being substantially less than about half again as long as the axial length of the mutually engaged portions of said tapered surfaces, and means comprising a part of said coupling unit coacting with said rings for holding said rings in mutually stressed coaxial assembly with said tapered surfaces in mutual engagement and preventing relative movement between said rings in the direction toward diminished stress while permitting relative movement between said rings in the direction tending to work the said unit to increased radial thickness whereby to grip said elements.

10. The coupling unit of claim 9 in which the said cylindrical surfaces of said inner and outer rings are appreciably bulged inwardly and outwardly respectively with approximate longitudinal symmetry.

11. A coupling unit adapted to grip and transmit force and motion between inner and outer elements, such as a shaft and a hub which have radially spaced, longitudinally aligned, coaxial cylindrical surfaces between which said unit is disposed and worked to increased radial thickness, said unit comprising a nested pair of annular inner and outer resilient rings coaxially and concentrically disposed in respect to the longitudinal axis of said unit, the inner ring having an inner circular cylindrical surface, a big end and a small end with an outer tapered surface therebetween; the outer ring having an outer circular cylindrical surface, a big end adjacent the small end of the inner ring and a small end adjacent the big end of the inner ring with an inner tapered surface between the big and small ends thereof coacting with the tapered surface of the inner ring, the big end of said inner ring being of less external diameter than the internal diameter of the small end of said outer ring, the big end of said outer ring being of greater internal diameter than the external diameter of the small end of said inner ring, and each of said big ends of said ring having a portion adjacent and radially spaced from and partially overlapped by an end portion of the tapered surface of the other ring and extending longitudinally beyond the small end portion of the other ring when said tapered surfaces are in mutual engagement, the over-all length of said unit when said tapered surfaces are in mutual engagement not being substantially less than about half again as long as the axial length of the mutually engaged portions of said tapered surfaces, the big ends of said inner and outer rings each having end surfaces lying approximately normal to the axis of the unit and intersecting said inner and outer cylindrical surfaces of said rings respectively in inner and outer corner circles respectively, and each of said end surfaces having a portion radially spaced from its respective corner circle and extending longitudinally beyond the plane of said corner circle.

12. A coupling unit comprising a mated pair of annular resilient inner and outer rings coaxially disposed and having respectively outer and inner mutually engageable tapered surfaces and having respectively big and little ends oppositely disposed with end surfaces on the big ends adapted to be oppositely borne upon with axial forces tending to induce relative axial motion therebetween and forcible sliding engagement of said tapered surfaces with expansion of said outer ring and contraction of said inner ring, the large end of the tapered surface in each ring being spaced from the end surface of the big end of each ring and the small end of the tapered surface in each ring overlying and being radially spaced from a portion of the big end of the other ring between the end surface thereof and the adjacent end of said tapered surface, the end surfaces of the big ends of each ring having contact with planes truly normal to the respective axes of the rings radially near the said tapered surfaces.

References Cited in the file of this patent

UNITED STATES PATENTS

| | | |
|---|---|---|
| 738,445 | Hoffman | Sept. 8, 1903 |
| 1,091,106 | Adams | Mar. 24, 1914 |
| 1,116,845 | Rogers | Nov. 10, 1914 |
| 1,722,623 | Bramwell | July 30, 1929 |
| 2,029,606 | Bredtschneider | Feb. 4, 1936 |
| 2,696,997 | McCloskey | Dec. 14, 1954 |
| 2,747,428 | Peter et al. | May 29, 1956 |